United States Patent [19]

Planchat et al.

[11] Patent Number: 4,830,936
[45] Date of Patent: May 16, 1989

[54] ACTIVATABLE ELECTROCHEMICAL BATTERY IMPLEMENTING LITHIUM/OXYHALIDE COUPLES

[75] Inventors: Jean-Pierre Planchat, Saint Benoit; Jean-Pierre Descroix, Fontenay Sous Bois; Philippe Jehanno, La Baule, all of France

[73] Assignee: Saft, S.A., Romainville, France

[21] Appl. No.: 204,758

[22] Filed: Jun. 10, 1988

[30] Foreign Application Priority Data

Sep. 29, 1987 [FR] France .................................. 87 13437

[51] Int. Cl.$^4$ ........................ H07M 6/36; H07M 6/46
[52] U.S. Cl. .................................. 429/110; 429/101; 429/113; 429/153; 429/154
[58] Field of Search ............... 429/110, 113, 153, 154, 429/101

[56] References Cited

U.S. PATENT DOCUMENTS

| 3,196,049 | 7/1965 | Schilke | 429/113 |
| 4,148,974 | 4/1979 | Eppley | 429/113 X |
| 4,283,470 | 8/1981 | Freeman et al. | 429/153 X |
| 4,471,035 | 9/1984 | Goebel et al. | 429/154 X |

Primary Examiner—Stephen J. Kalafut
Attorney, Agent, or Firm—Kenyon & Kenyon

[57] ABSTRACT

An activatable electrochemical battery implementing lithium/oxyhalide couples.

The present invention relates to an activatable lithium/SOCl$_2$ or lithium/SO$_2$Cl$_2$ primary battery in which means are provided for eliminating leakage currents and means are provided for controlling the temperature rise during discharge.

Thus, each electrochemical element is enclosed, in a sealed insulating housing constituted by a bottom, a cover, and a spacer constituting its side wall. The terminals of the elements are plates of nickel enabling heat to be dissipated into a heat-conducting resin.

3 Claims, 4 Drawing Sheets

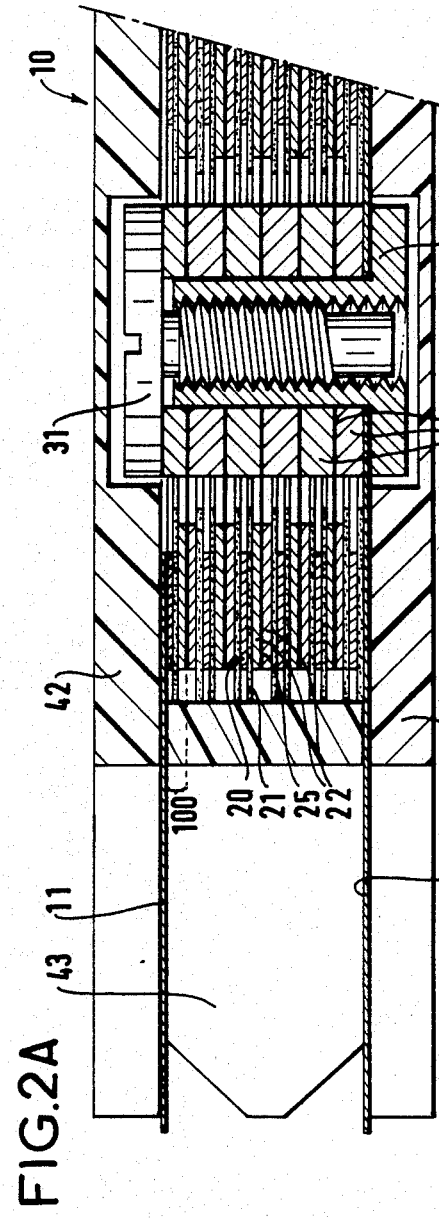
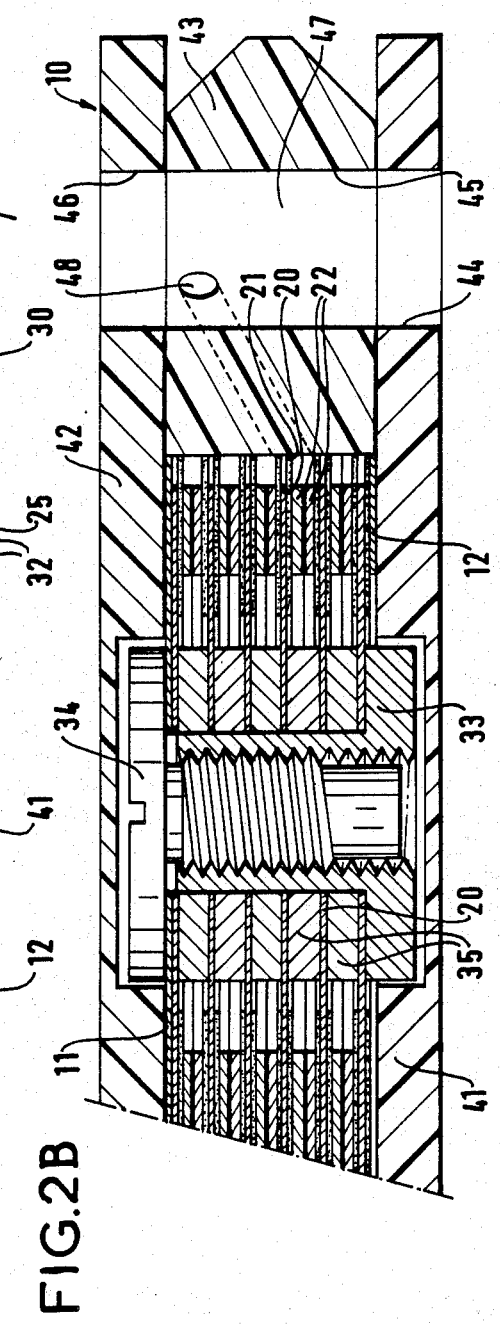
FIG.2A
FIG.2B

ACTIVATABLE ELECTROCHEMICAL BATTERY IMPLEMENTING LITHIUM/OXYHALIDE COUPLES

The present invention relates to an activatable electrochemical battery implementing a plurality of lithium-/oxyhalide couples, e.g. $Li/SOCl_2$ or $Li/SO_2Cl_2$.

BACKGROUND OF THE INVENTION

French Pat. No. 1 534 907 of June 22, 1967 describes an activatable electrochemical battery comprising a stack of flat elements connected electrically in series, with each flat element being constituted by a plurality of elementary cells which are electrically connected in parallel. The electrodes of each cell are provided with connection lugs situated at the periphery of the stack. Same-polarity lugs of the electrodes are interconnected by metal spacers and constitute a terminal for the corresponding element.

The flat elements are stacked on one another by threading their output terminals on two rods. Electrical series connection is obtained by successively threading a positive terminal and then a negative terminal and interposing a metal spacer or an insulating spacer as appropriate.

It has been observed that the above structure gives rise to leakage currents which are excessive. French Pat. No. 2 539 917 proposes limiting these leakage currents by providing perforations in the electrodes themselves for the purpose of threading on the connection rods, rather than providing perforations in peripheral external lugs. This disposition is still insufficient for activatable batteries using lithium/thionyl chloride or lithium/sulfuryl chloride.

The problem posed by using such batteries is very acute since they must be capable of satisfying the following two requirements:

open-circuit standby after activation for a period of several hours, which means that leakage currents must be completely eliminated; since in addition to the loss of capacity to which they give rise, leakage currents also set up a secondary phenomenon in which lithium foam is deposited, which foam may give rise to short circuits; and high rate discharge over a few minutes, thereby generating a large amount of heat.

It is therefore necessary to simultaneously solve a problem of electric insulation and a problem of controlling the temperature rise of the battery since an excessive temperature rise could lead to an explosion.

The object of the present invention is to solve this combined problem.

SUMMARY OF THE INVENTION

The present invention provides an activatable electrochemical battery implementing a plurality of lithium-/oxyhalide couples, the battery comprising a tank of electrolyte suitable for being put into communication with an electrochemical block by activation means, said electrochemical block comprising a stack of flat elements which are electrically connected in series, each flat element being constituted by a plurality of elementary cells which are electrically connected in parallel by means of internal metal rods onto which the electrodes are threaded together with spacers; in said battery each flat element is enclosed in a sealed insulating housing comprising a bottom, a cover, and a spacer defining its side wall, the bottom of one housing constituting the cover of the adjacent housing, the spacers, said bottom and said cover having corresponding orifices defining a common electrolyte feed well orthogonal to the set of elements; the spacers further including channels for transferring electrolyte from the feed well towards each element; the terminals of each element being constituted by two metal plates pressed respectively against the bottom and the cover of the corresponding housing with edges emerging from the housing in order to make said series electric connection possible; the set of housings and the edges of the metal plates emerging therefrom being embedded in a heat-conducting resin.

In a preferred embodiment, each electrolyte transfer channel provided in a spacer is small in diameter and long in length, with its dimensions being chosen so that after activation, the small quantity of electrolyte contained therein is very rapidly raised to boiling point.

Further, it is preferable for the quantity of electrolyte contained in the electrolyte tank to be such as to ensure that at least some electrolyte remains in the common feed well throughout discharge.

By using an insulating housing for each element, and by suitably selecting the dimensions of the electrolyte transfer channels, it is observed that all leakage currents are practically eliminated; the heating of the elements inherent to the structure of the insulating housings is dissipated by virtue of the current collector plates which serve as terminals for the elements and which have their emerging edges embedded in a heat-conducting resin.

BRIEF DESCRIPTION OF THE DRAWINGS

An embodiment of the invention is described by way of example with reference to the accompanying drawings, in which:

FIGS. 2A and 2B are fragmentary section views of a flat element belonging to the FIG. 1 electrochemical block;

MORE DETAILED DESCRIPTION

Figure 1:
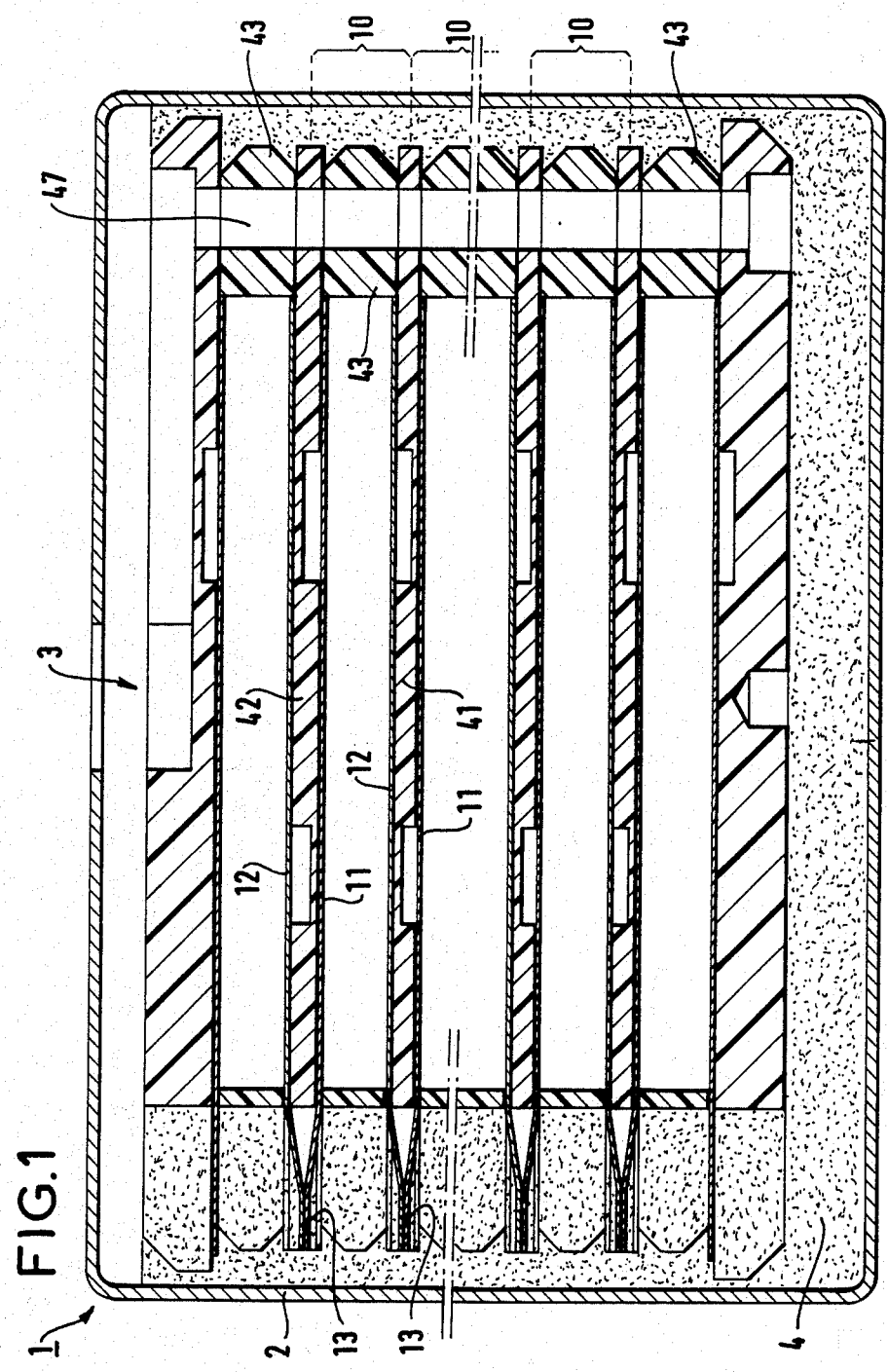
FIG. 1 is a diagrammatic fragmentary longitudinal section through an electrochemical block belonging to a battery in accordance with the invention.

FIG. 1 shows the electrochemical block 1 of a lithium anode battery in accordance with the invention. This electrochemical block contained in a metal case 2 has its top connected to an electrolyte tank associated with activation means (not shown). Reference 3 designates the opening for injecting the electrolyte which is an oxyhalide, preferably thionyl chloride or sulfuryl chloride.

The block 1 is constituted by a stack of flat elements 10 which are described with reference to FIGS. 2A and 2B, connected in series by means of metal plates 11 and 12, e.g. made of nickel, whose detailed structure is described below. FIG. 1 simply shows the connection 13 between two adjacent elements 10. The periphery of each flat element 10 and the edges of the plates 11 and 12 which emerge therefrom are embedded in a heat-conducting resin 4 such as epoxy resin filled with alumina, for example.

FIGS. 2A and 2B show a flat element 10 in greater detail. It comprises a stack of elementary cells 100 which are electrically connected in parallel. Each cell is constituted by a lithium anode 20, a separator 21, and a cathode 22.

Figure 6:
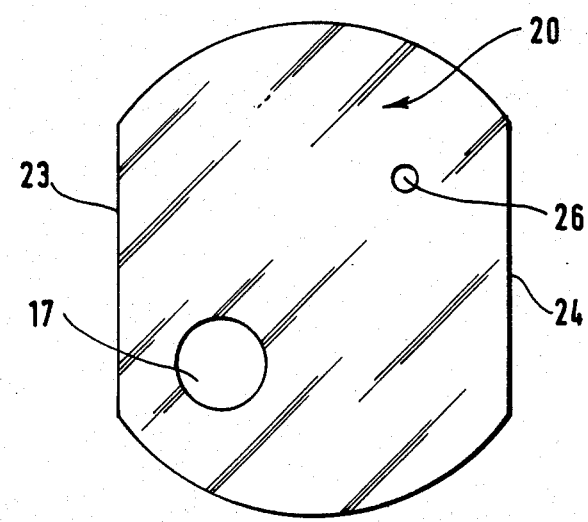
FIG. 6 is a view from above of a lithium anode belonging to the element of FIGS. 2A and 2B.

The geometry of the lithium anode appears in FIG. 6; it has a circular perimeter with two cut-off flats 23 and 24. It may be constituted by a single sheet of lithium or by two sheets of lithium encrusted in an interposed nickel grid.

The separator 21 is in the form of a disk and it is preferably constituted by two superposed layers: a layer which is mechanically strong and made of woven glass, and a microporous layer constituted by a fiberglass felt.

The cathode 22 has a shape similar to that of the anode 20: it is constituted by an electroformed nickel grid 25 whose faces are covered with acetylene black bonded by polytetrafluoroethylene.

It can be seen in FIG. 2A that the anodes and the cathodes are pierced by orifices for passing a pin 30 associated with a locking screw 31 and serving as a positive terminal. Metal spacers 32 bear against the grids 25 of the cathodes 22 and ensure adequate spacing of the cathodes and provide electrical connection thereto.

On the negative side (see FIG. 2B) a pin 33 is provided in association with a locking screw 34 and serving as a negative terminal: metal spacers 35 bear against the anodes 20 and ensure that they are spaced apart and provide electrical connection thereto.

FIG. 6 shows the orifice 26 provided in the anode 20 for passing the pin 33, and the orifice 17 provided for passing the pin 30 and the spacers 32. The cathodes 22 include similar orifices.

According to the invention, the elementary cells 100 connected together in this way are enclosed in a housing made of insulating material and constituted by a bottom 41, a cover 42, and a spacer 43 constituting its side wall. The substance from which the housing is made is preferably selected from melamine or fluoropolymers. When making the stack, the set of bottoms, covers, and spacers is compressed by means of draw bars (not shown) so as to ensure that each housing is sealed.

Figure 3:
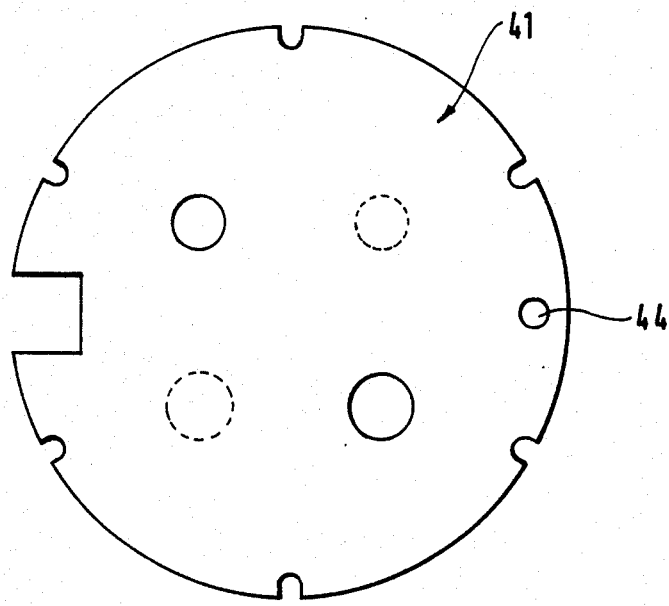
FIG. 3 is a view from above of a bottom or a cover belonging to a housing enclosing the element of FIGS. 2A and 2B.
Figure 4:
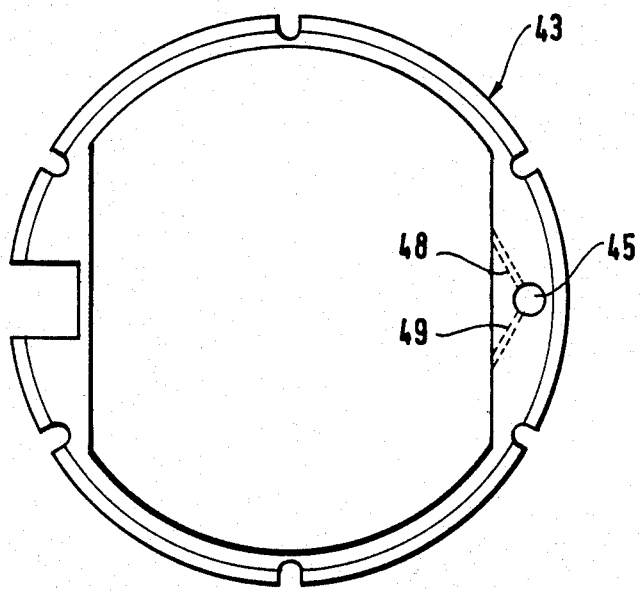
FIG. 4 is a view from above of the spacer forming the side wall of the housing enclosing the element of FIGS. 2A and 2B.

FIG. 3 is a top view of a bottom 41, and FIG. 4 is a top view of a spacer 43. The bottom 41, the cover 42, and the spacer 43 have respective facing orifices 44, 45, and 46 defining an electrolyte feed well 47 common to all of the elements 10. Each spacer further includes very fine channels 48 and 49 (FIG. 4) for transferring electrolyte from the common well 47 to the elementary electrochemical cells 100. These channels are small in section and their length is such that the quantity of electrolyte which they can contain is very small and it begins to boil very quickly after the battery has been activated. As soon as bubbles appear, the flow of electrolyte contained in the channel is interrupted and the leakage current disappears.

The channels are inclined relative to the plane of the electrodes for facilitating machining.

By way of example, the diameter of a channel is 1 mm and its length is 20 mm. The temperature in the channels rises by about 4° C. per second after the battery has been activated. Since the boiling point of the electrolyte is about 80° C. under one atmosphere, it takes about 20 seconds for the electrolyte to boil in the channels and interrupt the leakage currents.

The quantity of electrolyte in the tank is selected in such a manner that the common well 47 always contains some spare electrolyte in order to prevent the electrodes drying out. The electrolyte transferred in this way into the elements via the channels 48 and 49 very rapidly begins to boil again, and as soon as bubbles appear, the leakage currents are interrupted.

Figure 5:
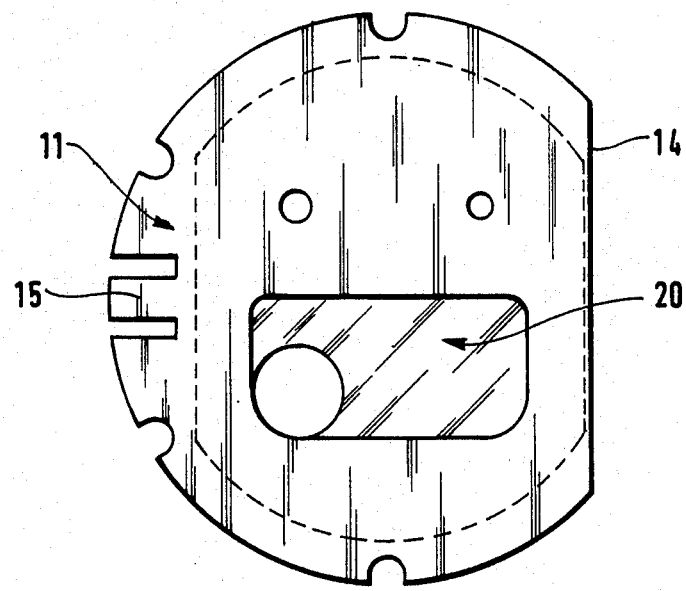
FIG. 5 is a view from above of a metal current collector constituting one of the terminals for the element of FIGS. 2A and 2B.

As already mentioned above, the terminals of the element 10 are constituted by plates of nickel 11 and 12 disposed respectively against the bottom 41 and the cover 42 of the element 10. FIG. 5 shows the plate 11 seen from above, said plate being generally circular in shape with a cut-off flat 13. The connection 13 between two adjacent elements is provided by a tongue 15.

By virtue of these nickel plates, the heat dissipated during discharge is evacuated towards the heat-conducting resin 4. By way of example, during a 10-minute discharge, 135,000 joules are dissipated. By virtue of the structure of the metal current collecting plates emerging into the heat-conducting resin, the temperature of the stack rises only to 50° C., whereas it would be more than 150° C. without this disposition, thereby running the risk of an explosion.

Naturally, the invention is not limited to the embodiment described above. Without going beyond the scope of the invention any means may be replaced by an equivalent means.

We claim:

1. An activatable electrochemical battery implementing a plurality of lithium/oxyhalide couples, the battery comprising a tank of electrolyte suitable for being put into communication with an electrochemical block by activation means, said electrochemical block comprising a stack of flat elements which are electrically connected in series, each flat element being constituted by a plurality of elementary cells which are electrically connected in parallel by means of internal metal rods onto which the electrodes are threaded together with spacers, wherein each flat element is enclosed in a sealed insulating housing comprising a bottom, a cover, and a spacer defining its side wall, the bottom of one housing constituting the cover of the adjacent housing, the spacers, said bottom and said cover having corresponding orifices defining a common electrolyte feed well orthogonal to the set of elements, the spacers further including channels for transferring electrolyte from the feed well towards each element, the terminals of each element being constituted by two metal plates pressed respectively against the bottom and the cover of the corresponding housing with edges emerging from the housing in order to make said series electric connection possible, the set of housings and the edges of the metal plates emerging therefrom being embedded in a heat-conducting resin.

2. An electrochemical battery according to claim 1, wherein each electrolyte transfer channel provided in a spacer is small in diameter and long in length, with its dimensions being chosen so that after activation, the small quantity of electrolyte contained therein is very rapidly raised to boiling point.

3. An electrochemical battery according to claim 1 or 2, wherein the quantity of electrolyte contained in the tank is selected in such a manner as to ensure that there always remains some electrolyte in the feed well.

* * * * *